United States Patent
Lopez Gomez et al.

(10) Patent No.: US 6,233,050 B1
(45) Date of Patent: May 15, 2001

(54) APPARATUS AND PROCESS FOR MEASURING THE UNROUNDNESS AND DIAMETER OF RAILWAY WHEELS

(75) Inventors: José Luis Lopez Gomez; Angel Luis Sanchez Revuelta; Carlos Javier Gomez Gomez, all of Madrid (ES)

(73) Assignee: Patenies Talgo, S.A., Madrid (ES)

( * ) Notice: Subject to any disclaimer, the term of this patent is extended or adjusted under 35 U.S.C. 154(b) by 0 days.

(21) Appl. No.: 09/350,023

(22) Filed: Jul. 9, 1999

(30) Foreign Application Priority Data

Aug. 12, 1998 (ES) .................................................... 9801744

(51) Int. Cl.$^7$ .................................................... G01B 11/02
(52) U.S. Cl. ............................................ 356/384; 356/386
(58) Field of Search .................................. 356/384, 385, 356/386, 387, 376; 250/559.22, 559.44; 33/203.18, 203, 203.13

(56) References Cited

U.S. PATENT DOCUMENTS 4,749,870 * 6/1988 Schmalfuss et al. ................. 356/385
4,798,963 * 1/1989 Wittkopp et al. .................... 356/385

FOREIGN PATENT DOCUMENTS 0751371    1/1997 (EP) .

* cited by examiner

Primary Examiner—Hoa Q. Pham
(74) Attorney, Agent, or Firm—Ladas and Parry

(57) ABSTRACT

Apparatus and process for measuring the unroundness and diameter of railway wheels in which a rolling rail is provided on which rolls a railway wheel to be measured, and a guard-rail centers the wheel during the measurement process. Several light sources project light beams at the periphery of the wheel at different transverse locations, such that the light beams continuously intersect the flange and rolling band of the wheel. The images produced by the light beams pass through filters to video cameras which store the images, and sends them to a computer which can process the images and determine unroundness and wheel diameter. The measurement process is initiated by a trigger system which detects the presence of a wheel on the rail and activates the measuring equipment when the wheel is at the beginning of a measuring zone and deactivates the equipment when the wheel is at the end of the measuring zone. The invention is applicable to the repair and maintenance of railway wheels.

9 Claims, 2 Drawing Sheets

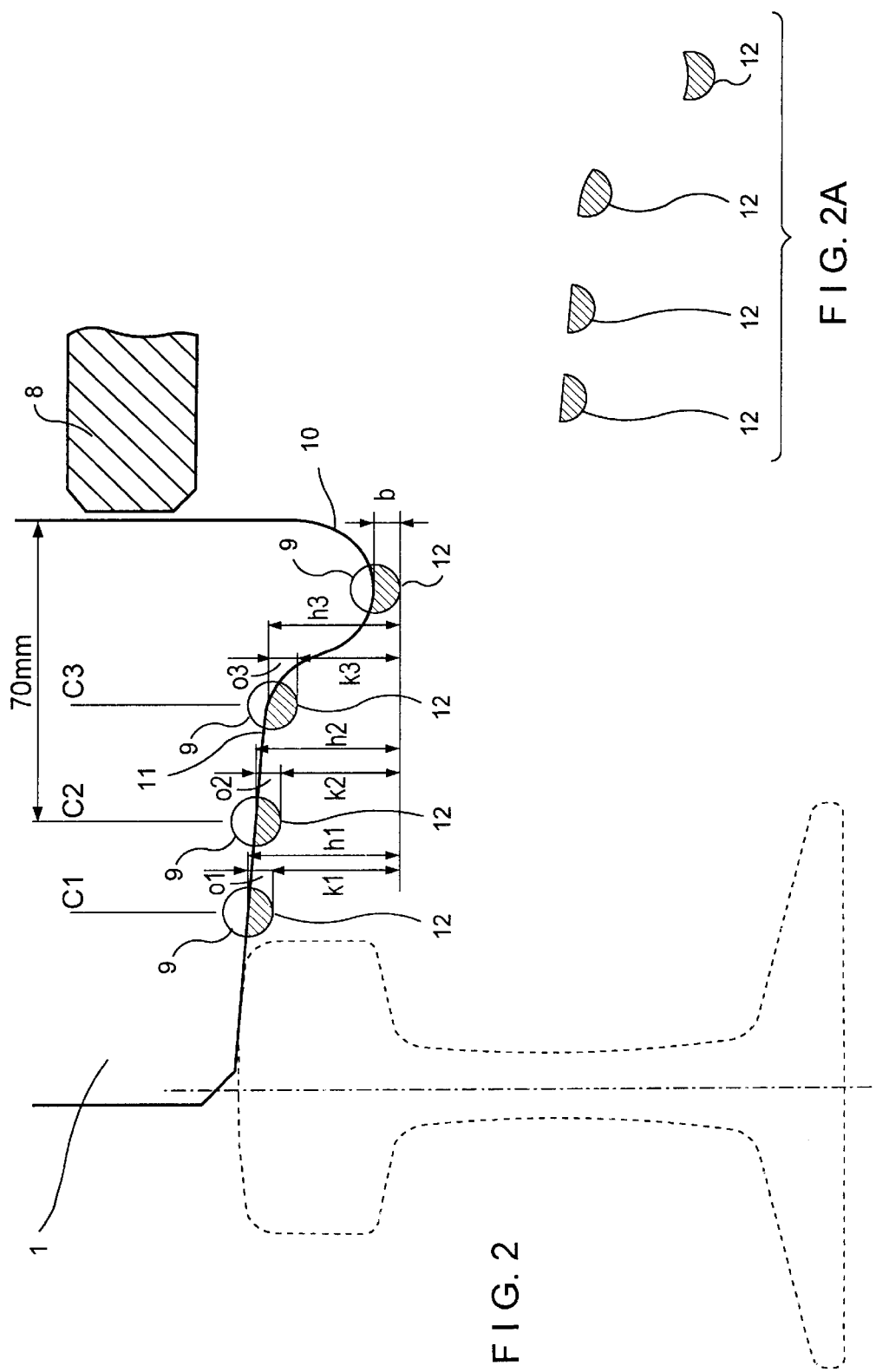

ns and minimum height of the wheel flange, being based on the fact that the flange circumference does not go out of roundness, such that when the rolling band of the wheel does so, variations in flange height are produced along the wheel development. In this measurement, visual means is used.

APPARATUS AND PROCESS FOR MEASURING THE UNROUNDNESS AND DIAMETER OF RAILWAY WHEELS

FIELD OF THE INVENTION

The present invention refers to the measurement of the unroundness of wheels as the difference between the maximum and minimum height of the wheel flange, being based on the fact that the flange circumference does not go out of roundness, such that when the rolling band of the wheel does so, variations in flange height are produced along the wheel development. In this measurement, visual means is used.

The mean flange height is taken as the mean and true height value.

If the diameter value of the last rolling band lathing is taken, twice the flange height of the last lathing is added and twice the height obtained as a mean value of this equipment is subtracted, the current diameter of the rolling band is obtained.

With a suitable computerized program it is possible to determine the rolling diameter ovalization and mean diameter value parameters of the wheel.

BACKGROUND OF THE INVENTION

The prior art to measure the unroundness and diameter of railway wheels is based on mechanical contacts, and not by visual means. Nevertheless, visual means has been used to measure different rolling parameters in railway vehicle wheels, for example EP-A-0 751 371 of the present applicant.

SUMMARY OF THE INVENTION

For a train moving on a track at a speed between 5 and 10 Km/h, the invention basically consists in the projection of several compact beams of light, for example, four, over the wheel to be measured, in the direction of movement of the wheel and parallel to the rail such that the beams continuously intersect the periphery of the flange and the rolling band of the wheel. The light sources may consist of laser generators for producing cylindrical laser beams.

The images generated by the light beams are captured through a filter by a video camera, which stores the images obtained at a rate of 50 to 76 images per wheel. These images are sent to a computer, where they are stored for later processing.

The length of the measurement installation will be equal or less than the bogie wheelbase which has a minimum value of 1.8 m. Preferably, the installation length will be 200 mm shorter than the bogie wheelbase.

Under these conditions, the complete development of the wheel will not be checked, such that it will be necessary to double or triple the basic installation until managing to measure the entire wheel development.

BRIEF DESCRIPTION OF THE DRAWINGS

The invention is described in greater detail below, referring to the attached drawings, in which:

FIG. 2 is a transverse view which shows a wheel rolling on a rail, the interference of the periphery of the wheel with the light beams and the parameters to be measured; and FIG. 2A is a detail from FIG. 2 showing the light beam images alone.

DETAILED DESCRIPTION OF THE INVENTION

Figure 1:
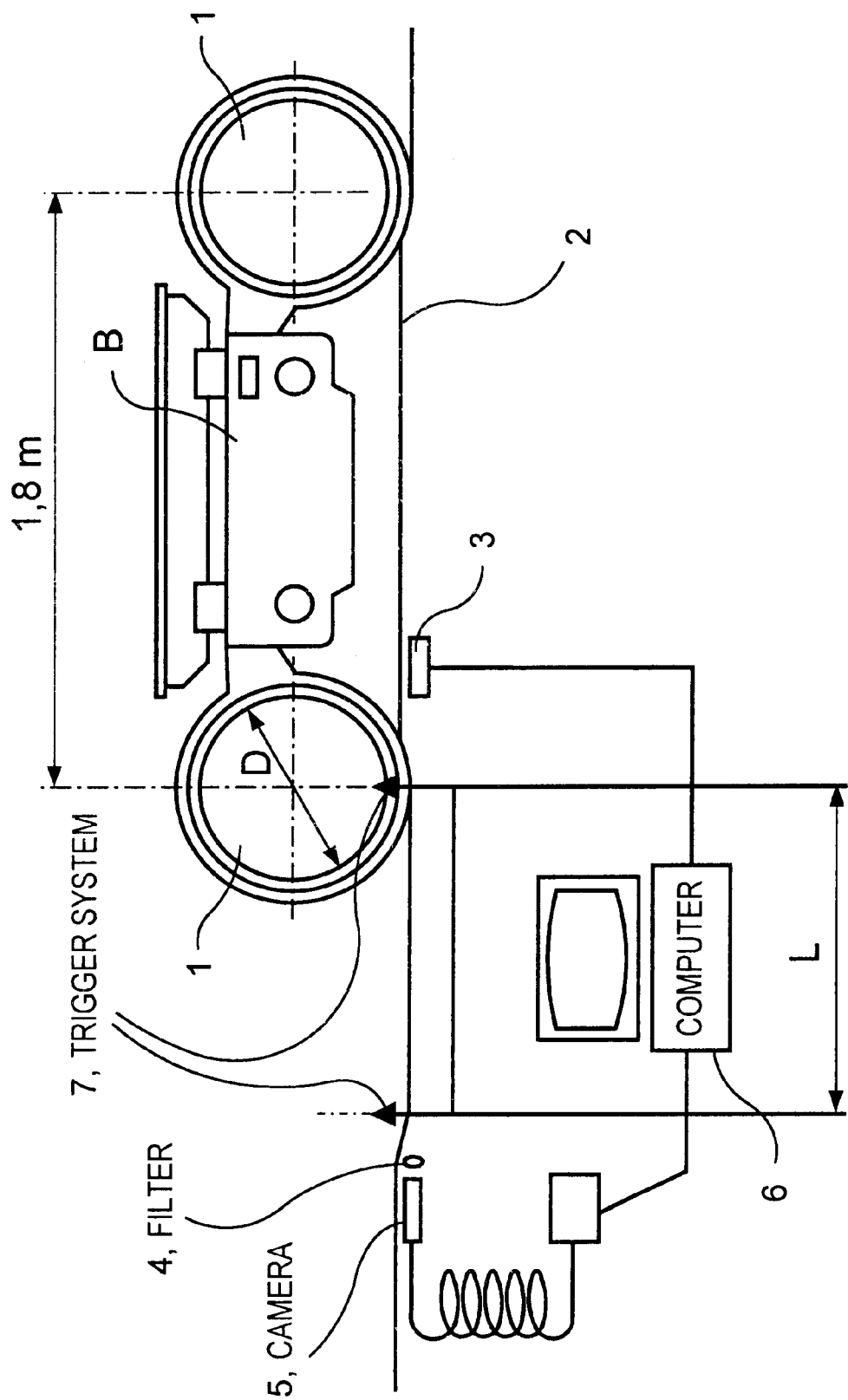
FIG. 1 shows the arrangement as a whole of the apparatus of the invention.

Firstly referring to FIG. 1, a bogie B is observed with wheels 1 to be measured which circulate along a rolling zone 2. Compact light sources 3 (only one is shown in FIG. 1) project compact light beams (FIG. 2) at a number of transverse locations along the wheel. The beams are projected the direction of wheel travel parallel to the rail. The beams are partially obscured by the periphery of the wheel as the wheel rolls along a measurement zone L. This distance is selected as equal or less than 1.8 m, or may be calculated in accordance with the equation $L=D/2*\pi$, wherein D is the wheel diameter shown in FIG. 1.

A filter 4 permits images to be obtained like those shown in FIG. 2, and a video camera 5 captures the images, at a rate of 50 to 76 images. The images are shown alone in the detail in FIG. 2A.

The images captured by the video camera 5 are sent to a computer 6, where they are stored for later processing.

The installation shown in FIG. 1 is completed with a trigger system 7, which detects the presence of a wheel 1 and activates when the wheel arrives at the beginning of the measurement zone L and the measuring equipment deactivates the measuring equipment when the wheel is at the end of the measurement.

Referring now to FIG. 2, a the rail 2 is shown in dotted outline at the location where it supports the wheel 1 to be measured and wherein a guard-rail 8 keeps the wheel centered during the measuring process.

Likewise, observed in FIGS. 2 and 2A are the interference images 12 of the wheel flange 10 and rolling band 11 with the compact light beams 9 on different rolling circles $c_1$, $c_2$, $c_3$, captured by the video camera 5. These interference images are stored in the computer 6 indicated in FIG. 1, and later the measurements $K_1$, $K_2$, $K_3$, and b are obtained, as well as $a_1$, $a_2$, $a_3$, hence obtaining the height measurements $h_1$, $h_2$ and $h_3$, at several points of the wheel development. All the measurements are illustrated in FIG. 2.

Between 50 and 76 values will be obtained for the examined wheel development.

Comparing values $h_{1i}$, $h_{2i}$ and $h_{3i}$, the ovalization of the three rolling circles $c_1$, $c_2$ and $c_3$ will be obtained as the difference between $h_{imax}$ and $h_{imin}$.

As seen from FIG. 2, the following equations are satisfied:

$$h_1=k_1+a_1-b$$
$$h_2=k_2+a_2-b$$
$$h_3=k_3+a_3-b$$

The mean of the $h_2$ values is the mean value of the height and is expressed by the following ratio:

$$h_m = \frac{\sum h_{2i}}{h_i}$$

Likewise the equation below is satisfied:

$$D_{ma}=D_m+2h-2h_m$$

wherein $D_m$ is the diameter measured after the last machining of the wheel, h is the flange height measured after the last machining, $D_{ma}$ is the current wheel diameter and $h_m$ is the current wheel flange height.

By using the apparatus of the invention, it will be possible to measure rolling heights throughout the development of a wheel by means of visual means, as well as obtaining the rolling circle ovalization as the difference between $h_{max}$ and $h_{mim}$ of the different circles along the development of the wheel.

Likewise, with the apparatus of the invention the rolling diameter may be obtained starting from that obtained after he last machining and considering the mean height of the rolling circle which is located at 70 mm from the inside face of the wheel.

Although the above discloses the essential features of the present invention, it will be understood that the invention may be varied or modified by those skilled in the art. For this reason, the scope of the invention is only limited by the contents of the attached claims.

What is claimed is:

1. Apparatus for measuring unroundness and diameter of a railway wheel comprising:

a rail on which a wheel to be measured can roll along a measuring zone, a guard rail to center the wheel on the rail during a measurement thereof, a plurality of light sources disposed in transversely spaced relation relative to said rail to project a plurality of light beams longitudinally of said rail to intersect the wheel at a periphery of a flange and of a rolling band of the wheel, said light sources being positioned so that said wheel obscures a portion of each said light beam as a function of the wheel diameter, a video camera aligned with each said light source to receive an image of said light beam partially obscured by said wheel, a computer connected to said video camera to determine unroundness and diameter of said wheel based on the images received by said video cameras, and a trigger system for activating the light sources and said cameras when said wheel arrives at said measuring zone and for deactivating said light sources and said cameras when said wheel exits from said measuring zone.

2. Apparatus as claimed in claim 1, wherein said rail has a length along said measuring zone which is at least equal to the circumference of said wheel.

3. Apparatus as claimed in claim 1, comprising filters between said cameras and said light sources.

4. Apparatus as claimed in claim 1, wherein said video cameras are adapted to obtain and store between 50 to 75 images as said wheel traverses said measuring zone.

5. Apparatus as claimed in claim 1, wherein a bogie supports railway wheels with a wheelbase spacing and said measuring zone has a length not greater than said wheelbase.

6. Apparatus as claimed in claim 5, wherein said length of said measuring zone is 200 mm less than said wheelbase.

7. Apparatus as claimed in claim 1, wherein said light sources are four in number, one for said flange of the wheel and three for said rolling band.

8. Apparatus as claimed in claim 1, wherein said light sources produce cylindrical laser beams.

9. Apparatus as claimed in claim 1, wherein said light sources are positioned to direct said light beams in a direction substantially parallel to said rail.

* * * * *